Aug. 21, 1923.

R. L. STRAIN

SPRAYING DEVICE

Filed Jan. 24, 1922

Robert L. Strain
INVENTOR

BY

ATTORNEY

WITNESS:

Aug. 21, 1923.

R. L. STRAIN

SPRAYING DEVICE

Filed Jan. 24, 1922

WITNESS:

Robert L. Strain
INVENTOR

BY

ATTORNEY

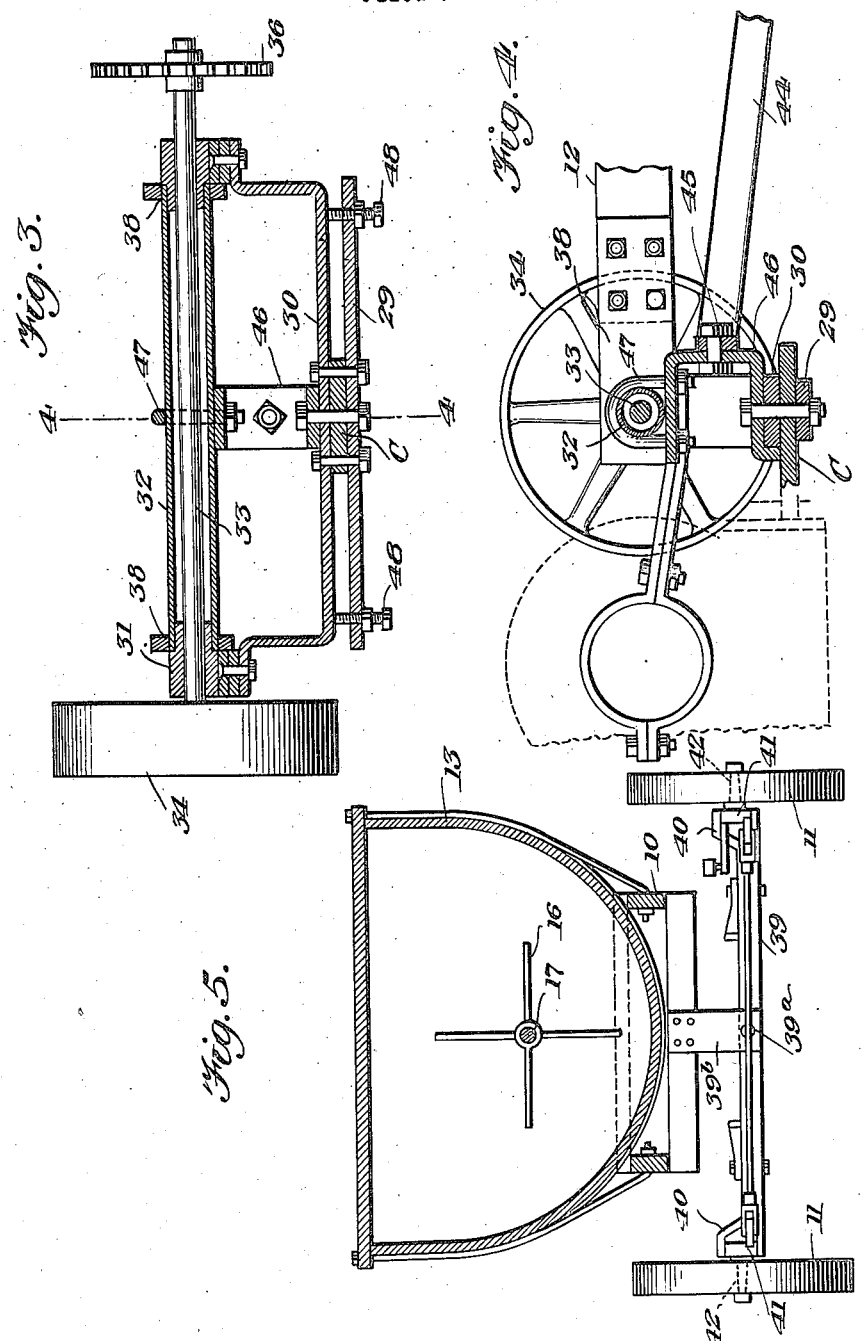

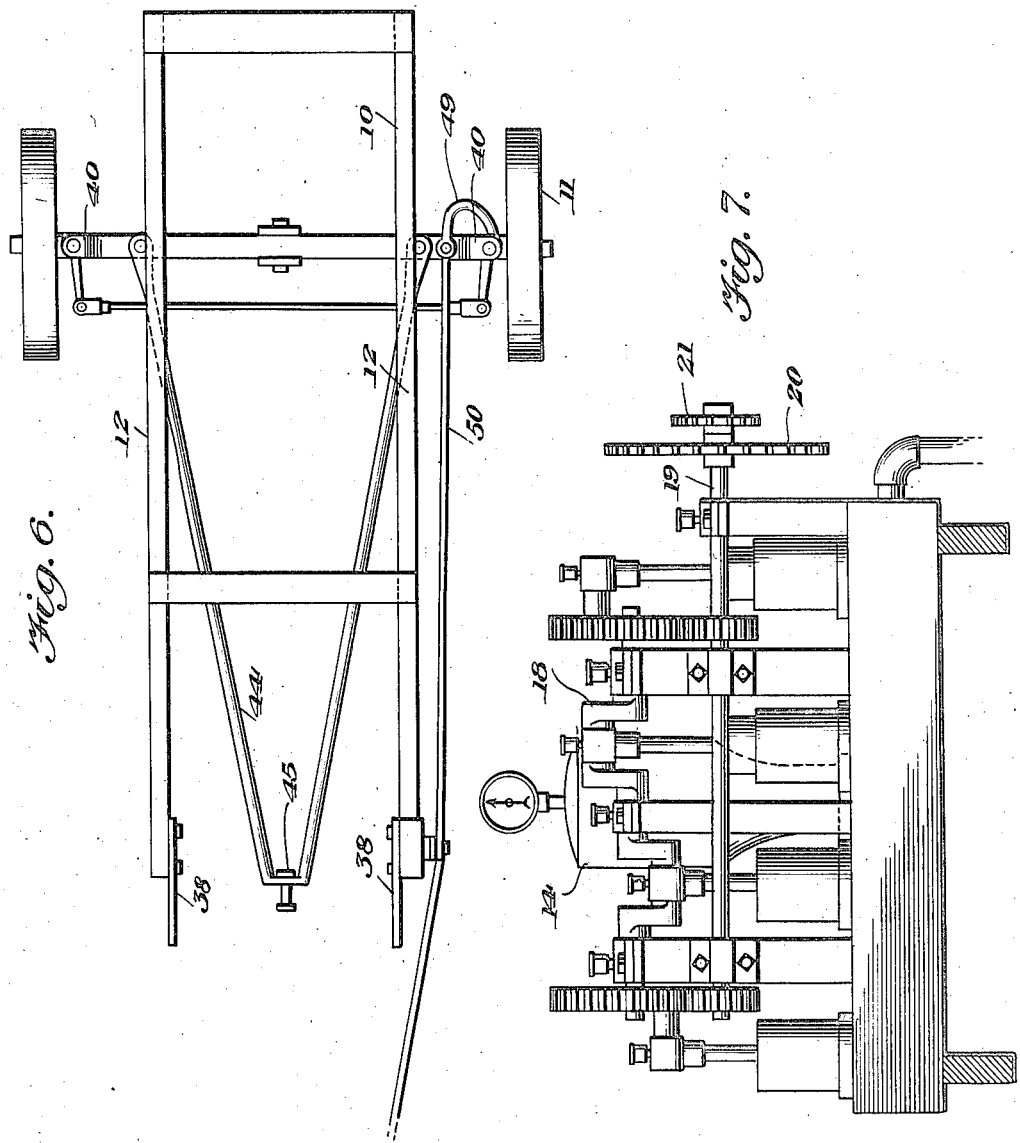

Patented Aug. 21, 1923.

1,465,377

UNITED STATES PATENT OFFICE.

ROBERT L. STRAIN, OF CLIFTON, COLORADO.

SPRAYING DEVICE.

Application filed January 24, 1922. Serial No. 531,443.

*To all whom it may concern:*

Be it known that I, ROBERT L. STRAIN, a citizen of the United States, residing at Clifton, in the county of Mesa and State of Colorado, have invented new and useful Improvements in Spraying Devices, of which the following is a specification.

This invention relates to spraying devices designed to be used in association with a tractor, novel means being provided for driving the spraying mechanism from the drive pulley commonly provided on tractors.

An important object is the provision of a novel connection between the spraying mechanism and the tractor for transmitting power across the joint or point of connection of the tractor with the spraying device, the sprayer per se being formed as a complete and separate entity mounted upon its own wheels and trailing behind the tractor.

Another object is the provision of a trailer connection of such a character that the spraying device and its operating mechanism will be rigid with respect to the tractor, the ground engaging wheels supporting the sprayer turning independently of the frame, the advantage of this arrangement being that turns at comparatively sharp corners may be easily made without placing any great degree of strain upon the drive gear.

The invention further resides in the provision of certain novel details of construction and arrangement of the parts which constitute the drive connection for transmitting the power as well as the trailer connection, together with certain features relative to the pumping and agitating mechanism for operating the sprayer.

An additional object is the provision of a device of this character which will be simple and comparatively inexpensive in construction, easy to install, highly efficient in use, durable in service and a general improvement in the art.

With the above and other objects and advantages in view, the invention consists in the details of construction to be hereinafter more fully described and claimed, and illustrated in the accompanaying drawings in which, Figure 1 is a side elevation of the rear end of a tractor and showing the sprayer associated therewith, one rear wheel of the tractor being removed.

Figure 3 is a cross-sectional view taken through the forward end of the sprayer supporting frame and looking toward the pumping mechanism.

Figure 4 is a cross-sectional view along the draw-bar of the tractor and showing my power transmitting device associated therewith, the section being taken on the line 4—4 of Figure 3.

Figure 5 is a cross-sectional view taken through the sprayer and its supporting frame, Figure 6 is a plan view of the sprayer frame and Figure 7 is an elevation of the pumping mechanism.

Figure 1:
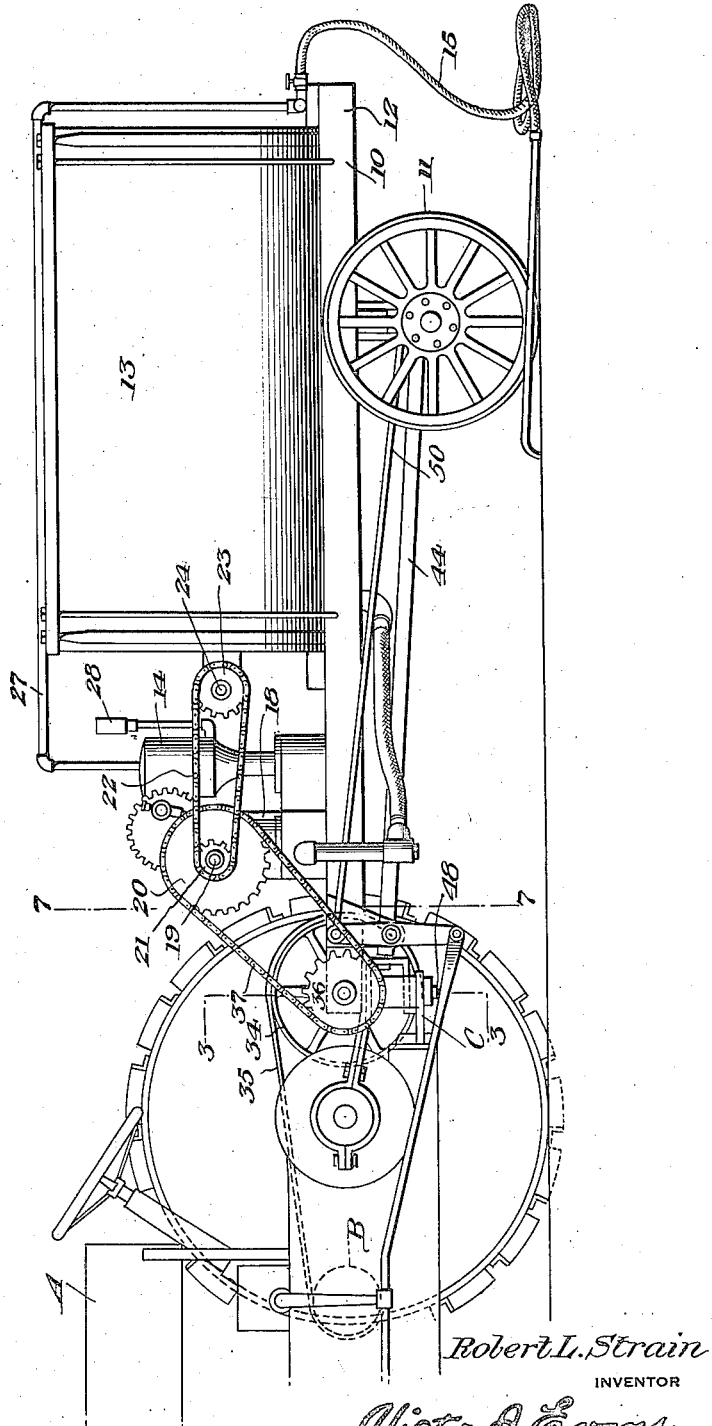
Figure 2:
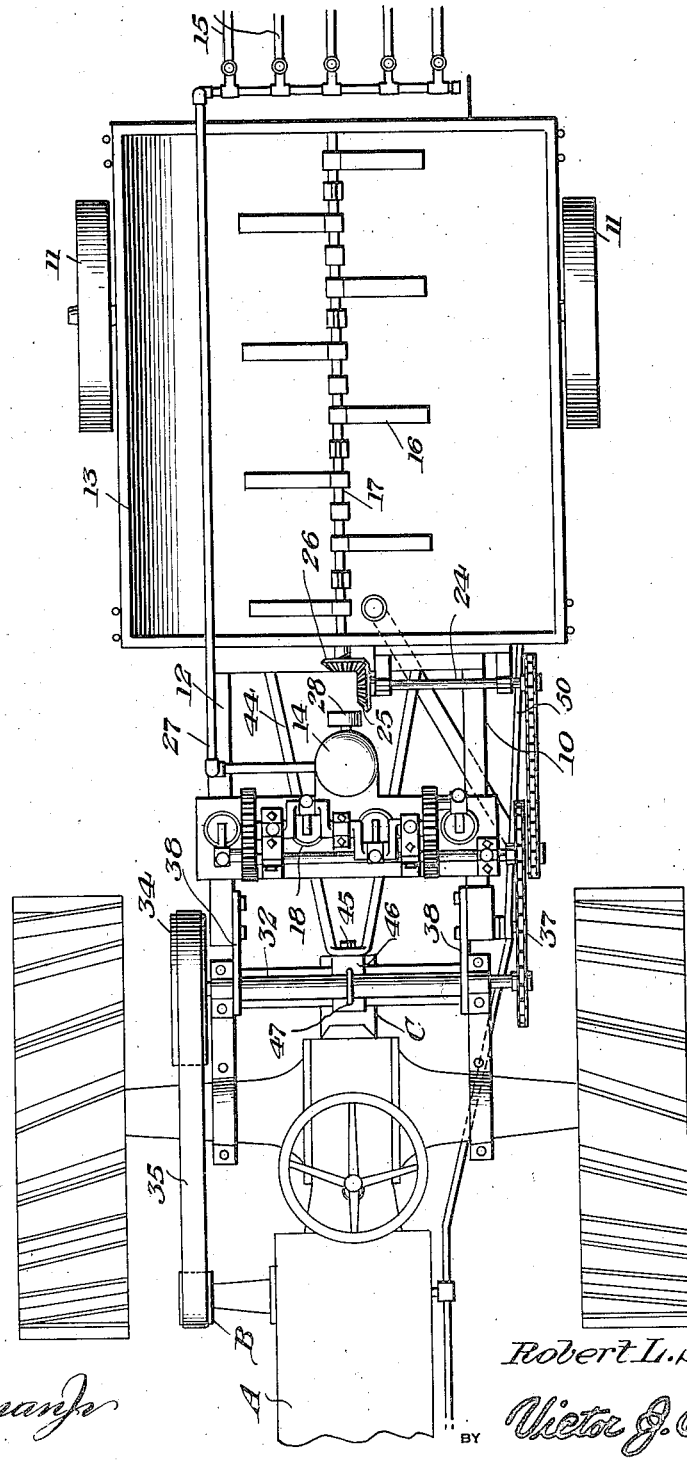
Figure 2 is a plan view, the top of the spray tank being removed.

Referring more particularly to the drawings, the letter A designates a portion of a tractor of any ordinary or preferred type and B designates the drive pulley by means of which power may be transmitted to any mechanism to be driven. At its rear end the tractor frame carries a draw-bar C which provides the draft means for pulling any desired implement.

In carrying out the present invention I provide a frame 10 mounted upon two wheels 11 and including longitudinal bars 12. Mounted upon this frame is a tank 13 holding the solution which is designed for spraying purposes. Associated with this tank is a pressure equalizing tank 14 which has suitable piping leading therefrom to one or more spray hoses 15. Within the tank 13 is an agitating device 16 having an operating shaft 17 and which is for the purpose of keeping the contents of the tank thoroughly mixed.

Mounted upon the frame 10 in advance of the tank is a fluid pump 18 of which the tank 14 is a part having a drive shaft 19 provided at one end with a relatively large sprocket 20 and a relatively small sprocket 21 about which is trained a chain 22 which passes over a sprocket 23 mounted upon a suitably journalled shaft 24 which carries a beveled gear 25 meshing with a beveled gear 26 on the agitator shaft 17. Leading from the tank 14 is a pipe 27 which leads to the hoses 15 and associated with the tank 14 at some convenient point is a pressure gauge 28.

In order that the pump and agitating device may be driven, I provide a heavy bar 29 which is bolted on to the drawbar C and to which is secured a bracket 30 provided at its sides with boxings 31 with which is associated and between which extends a housing 32 within which rotates a shaft 33 having one end carrying a pulley 34 driven from the pulley B of the tractor by means of a suitable belt 35. Mounted on the other end of the shaft 33 is a sprocket 36 about which is trained a chain 37 which is in turn trained about the large sprocket 20 on the compressor shaft. The forward ends of the frame bars 12 of the spraying device are hingedly connected with the bracket 30 so that up and down movement of the sprayer with respect to the tractor will be permitted as when passing over rough or uneven ground. This hinge connection is designated by the numeral 38.

The axle 39 of the spray is pivoted at its center, as shown at 39ª upon a bracket arm 39ᵇ on the sprayer frame and is provided at its ends with yokes 40 within which are pivoted spindle bodies 41 carrying spindles 42 upon which the wheels 11 which support the sprayer are rotatably mounted. Connected with the axle is a V-shaped radius rod passing through a U-shaped bracket 46 which has its lower arm secured to the drawbar C and which has its upper arm carrying an inverted U-shaped clip 47 which is secured upon the housing 32 at the center thereof. It is preferable to provide the bar 29 with set screws 48 which engage against the bracket 30 near the ends thereof for leveling purposes. One spindle body 41 has a steering arm 49 with which is pivotally connected a rod 50 which leads forward and which is connected with the steering mechanism of the tractor.

In the operation of the device it will be seen that as the tractor is drawn along the sprayer will trail behind it and as the tractor is steered in one direction or the other the wheels of the sprayer will be correspondingly moved owing to the connection of the steering rod 50 with the steering mechanism of the tractor and with the dirigible wheels of the sprayer. In this way it will be seen that a sharp turn may be made which will enable the device to be used in comparatively close quarters, this feature being highly advantageous as for instance when spraying an orchard. It will be noted that the strain is at the center of the housing and the pull is from a single point so that any tendency to twist will have no ill effects. When the drive pulley B of the tractor is rotated it is apparent that the motion will be communicated through the chain and sprocket mechanism above described to the pump and to the agitating means within the spraying tank, thus providing ample power for carrying out the spraying operations. When the pump is driven it is apparent that the solution will be drawn from the tank 13 through the pump and be discharged through the pressure tank or chamber 14 through the pipe 27 to the outlet hoses 15. If desired, the sprocket and chain connections described and illustrated might be replaced by belts and pulleys or by gears as these various drives are mechanical equivalents.

From the foregoing description and a study of the drawings it will be apparent that I have thus provided a simply constructed and consequently comparatively inexpensive power connection between a tractor and a spraying device and also a novel draft connection whereby the spraying device or other implement may be trailed behind a tractor in such a way that the steering of the implement drawn will be controlled automatically by the steering of the tractor and furthermore without any twisting or binding action which might tend to cause injury to any of the parts. It will also be noted that by removing a few bolts my device may be disconnected entirely from the tractor leaving the latter absolutely free for use in any other capacity. Owing to the simplicity of the construction and the fewness of the parts it will be apparent that there is practically nothing to get out of order and that the device should consequently have a long life and satisfactorily perform all the functions for which it is intended.

While I have shown and described the preferred embodiment of the invention it is of course to be readily understood that I reserve the right to make such changes in the form, construction and arrangement of parts as will not depart from the spirit of the invention or the scope of the subjoined claims.

Having thus described my invention I claim:

1. In combination with the drawbar of a tractor, a trailer, a coupling for the trailer comprising a bracket secured upon the drawbar, a housing mounted upon said bracket, a drive shaft journaled through said housing and driven from the power pulley of the tractor, a power transmitting element on the other end of the said shaft, the trailer having an axle provided with dirigible wheels, and a radius rod connected with the axle and detachably connected with said bracket and housing.

2. In combination with the drawbar of a tractor and a trailer, the trailer having a rigid axle carrying dirigible wheels, a bracket secured upon the drawbar, a power shaft journalled upon said bracket and driven from the drive pulley of the tractor and provided with a power transmitting element designed to drive the mechanism on the trailer, a bracket secured upon said first named bracket, and a radius rod connected with the axle and with said last named bracket.

3. The combination with the drawbar of a tractor and with a trailer, of a connection between the drawbar and the trailer comprising a bracket secured upon the drawbar, a housing mounted upon said bracket, a shaft journaled through said housing and driven from the drive pulley of the tractor a power transmitting element on said shaft for driving the mechanism on the trailer, a trailer having a rigid axle provided with yokes, spindles pivoted in said yokes and carrying the wheels of the trailer, a V-shaped radius rod connected with said axle, and a second bracket secured to said first named bracket and said housing and having a swivel connection with the forward end of the radius rod.

4. The combination with the drawbar of a tractor and with a trailer, of a connection between the drawbar and the trailer comprising a bracket secured upon the drawbar, a housing mounted upon said bracket, a shaft journaled through said housing and driven from the drive pulley of the tractor, a power transmitting element on said shaft for driving the mechanism on the trailer, a trailer having a rigid axle provided with yokes, spindle bodies pivoted in said yokes and carrying the wheels of the trailer, a V-shaped radius rod connected with said axle, and a second bracket secured to said first named bracket and said housing and having a swivel connection with the forward end of the radius rod, the trailer having a frame including longitudinal bars and hinge members connected with said bars and with said first named bracket and a connection between the steering gear of the tractor and said spindle bodies.

In testimony whereof I affix my signature.

ROBERT L. STRAIN.